United States Patent [19]
Blanding et al.

[11] Patent Number: 5,294,943
[45] Date of Patent: * Mar. 15, 1994

[54] METHOD AND APPARATUS FOR ALIGNMENT OF SCAN LINE OPTICS WITH TARGET MEDIUM

[75] Inventors: Douglass L. Blanding, Rochester; Michael E. Harrigan, Webster; David Kessler, Rochester; all of N.Y.

[73] Assignee: Eastman Kodak Company, Rochester, N.Y.

[*] Notice: The portion of the term of this patent subsequent to Sep. 29, 2009 has been disclaimed.

[21] Appl. No.: 785,346
[22] Filed: Oct. 31, 1991
[51] Int. Cl.⁵ .................. H04N 1/21; G01D 15/16
[52] U.S. Cl. ......................... 346/108; 346/139 R
[58] Field of Search ............ 346/139 R, 108, 160, 346/76 L, 107 R, 1.1

[56] References Cited

U.S. PATENT DOCUMENTS

| | | | |
|---|---|---|---|
| 3,922,060 | 11/1975 | Oosaka et al. | 350/3.5 |
| 4,040,097 | 8/1977 | Mizuno | 360/2 |
| 4,043,632 | 8/1977 | Jeffery et al. | 350/7 |
| 4,239,326 | 12/1980 | Kramer | 350/3.71 |
| 4,243,293 | 1/1981 | Kramer | 350/3.71 |
| 4,304,459 | 12/1981 | Kramer | 350/3.71 |
| 4,397,521 | 8/1983 | Antos et al. | 359/198 |
| 4,487,472 | 12/1984 | Asano | 350/3.71 |
| 4,695,698 | 9/1987 | Mayor et al. | 219/121 |
| 4,826,268 | 5/1989 | Kramer | 350/371 |
| 4,904,034 | 2/1990 | Narayan et al. | 350/3.71 |
| 5,151,810 | 9/1992 | Blanding et al. | 359/198 |

Primary Examiner—Mark J. Reinhart
Attorney, Agent, or Firm—Warren Locke Franz; Dana M. Schmidt

[57] ABSTRACT

Positioning of a scan line (L) relative to a recording medium drum (15) of a polygon printer is established by independently adjusting blocks (35, 36) mounted on a scan line generating optics module (10). The blocks (35, 36) have inverted V-notches (38) that nest in two-point tangential contact onto cylindrical surfaces of drum bearings (33, 34). X, z, $\theta_x$ and $\theta_z$ positions are set by x and z direction adjustment screws (44, 45, 49, 50) mounted on frame (11) that move against blocks (35, 36) against the bias of springs (61) and the weight of the frame (11). Clamping screws (56, 57) pass through oversized holes (58) and z direction elongated slots (59) on blocks (35, 36) to releasably lock blocks (35, 36) after adjustment. Alignment of holes (58), slots (59) and notches (38) maintains a constant angle of incidence during adjustment. A notch (41) of projection (40) of frame (11) engages with a pin (42) on printer body (29) to set y and $\theta_y$ positioning.

20 Claims, 3 Drawing Sheets

METHOD AND APPARATUS FOR ALIGNMENT OF SCAN LINE OPTICS WITH TARGET MEDIUM

TECHNICAL FIELD

This invention relates generally to a method and apparatus for accurately positioning scan line generating optics relative to an intended scan line receiving target medium; and, in particular, to a "drop-in" optics module for a polygon printer or the like, having means for accurately locating the generated scan line relative to a photosensitive recording medium carried on a rotating drum.

BACKGROUND ART

The positioning of a raster scan line, like that generated by the optics of a polygon laser printer such as shown in U.S. patent application Ser. No. 07/637,429, filed Jan. 4, 1991, onto an x-ray film or other photosensitive image recording medium involves assuring accurate alignment in the x (cross-scan), y (scan) and z (beam path) translational T directions, as well as in the $\theta_x$, $\theta_y$ and $\theta_z$ rotational directions respectively about each of the x, y and z directions. Proper positioning also requires attainment of the right angle of incidence of the beam onto the target medium.

Excessive focal shift errors of the scan line with respect to the recording medium can lead to a printing artifact called banding. Banding is an undesirable periodic density modulation in the image that is most noticeable in uniform density regions. A very high degree of accuracy of scan line placement is required especially for laser printers used for x-ray films, because banding artifacts can lead to false diagnoses. The eye is very sensitive to low frequency (1-8 cycles/degree) contrast modulation, having a threshold as low as, 0.2% under the right illumination conditions. The design goal typically will use half this tolerance, so it will have 0.1% allowable line shift for the extreme polygon facet error. For a printer with a line pitch of 0.08 mm, the allowable error is thus only $80 \times 10^{-9}$ mm. This requirement means that only a very small focus error can be present for the page cross section of the beam.

Antos et al. U.S. Pat. No. 4,397,521 discloses a polygon raster scanner having a pair of adjustable screws which cooperate with a leaf spring to precisely aim a laser beam toward the optical system. Jeffery et al. U.S. Pat. No. 4,043,632 discloses a polygon mirror with adjustable facets. Kramer U. S. Pat. No. 4,826,268 discusses banding in a hologon scanner. Oosaka et al. U. S. Pat. No. 3,922,060 discloses the use of slidable "v" pads for accurate motion of a movable stage for an optical bench in hologram recorder. Other patents describing related subject matter include the following U.S. Pat. Nos.: 4,040,097; 4,239,326; 4,243,293; 4,304,459; 4,487,472; and 4,904,034.

Scan line generating optics systems are susceptible to two types of focusing errors: those which cause deviations of the scan curve from a straight line; and those which displace the scan line from its intended generatrix line on the target drum. The f-θ condition correcting and other optical elements can be manufactured with sufficiently tight tolerances and alignment procedures to ensure the generation of an acceptably straight (i.e. non-arcuate) scan line in space. This invention addresses a method and apparatus for ensuring proper placement of the spatially generated scan line onto the recording medium.

DISCLOSURE OF THE INVENTION

It is an object of the present invention to provide a method and apparatus for ensuring the proper placement of a scan line generated by the optics of a polygon laser printer or the like onto a recording medium mounted on a rotating drum or other target medium supporting mechanism.

It is a further object of the invention to provide an inexpensive mechanism for adjustably setting the x, z, $\theta_x$, $\theta_z$ and angle of incidence positioning, relative to a recording medium supported on a rotating drum, of a scan line generating optics module of a polygon printer.

In accordance with one aspect of the invention, beam source, shaping and scanning optics of a polygon printer are mounted on a rigid module and arranged to generate a raster scan line in space. Adjustable means is provided to mechanically rigidly connect the optics module relative to a printer target drum to accurately place the generated scan line onto a recording medium supported for scanning on the drum. In a preferred embodiment, described in greater detail below, an adjustable connection is provided by two inverted V-notched blocks that are selectively positionable relative to the module frame and which are brought into nesting relationship onto cylindrical surfaces of bearings mounted coaxially with the drum shaft.

BRIEF DESCRIPTION OF THE DRAWINGS

Embodiments of the invention have been chosen for purposes of illustration and description, and are shown with reference to the accompanying drawings, wherein.

Throughout the drawings, like elements are referred to by like numerals.

MODES OF CARRYING OUT THE INVENTION

The principles of the invention are illustrated with reference to an exemplary implementation of apparatus suitable for proper positioning of the optics of a polygon printer relative to a photosensitive medium, such as an x-ray film mounted for line-to-line advancement on the cylindrical surface a rotating drum.

Figure 1:
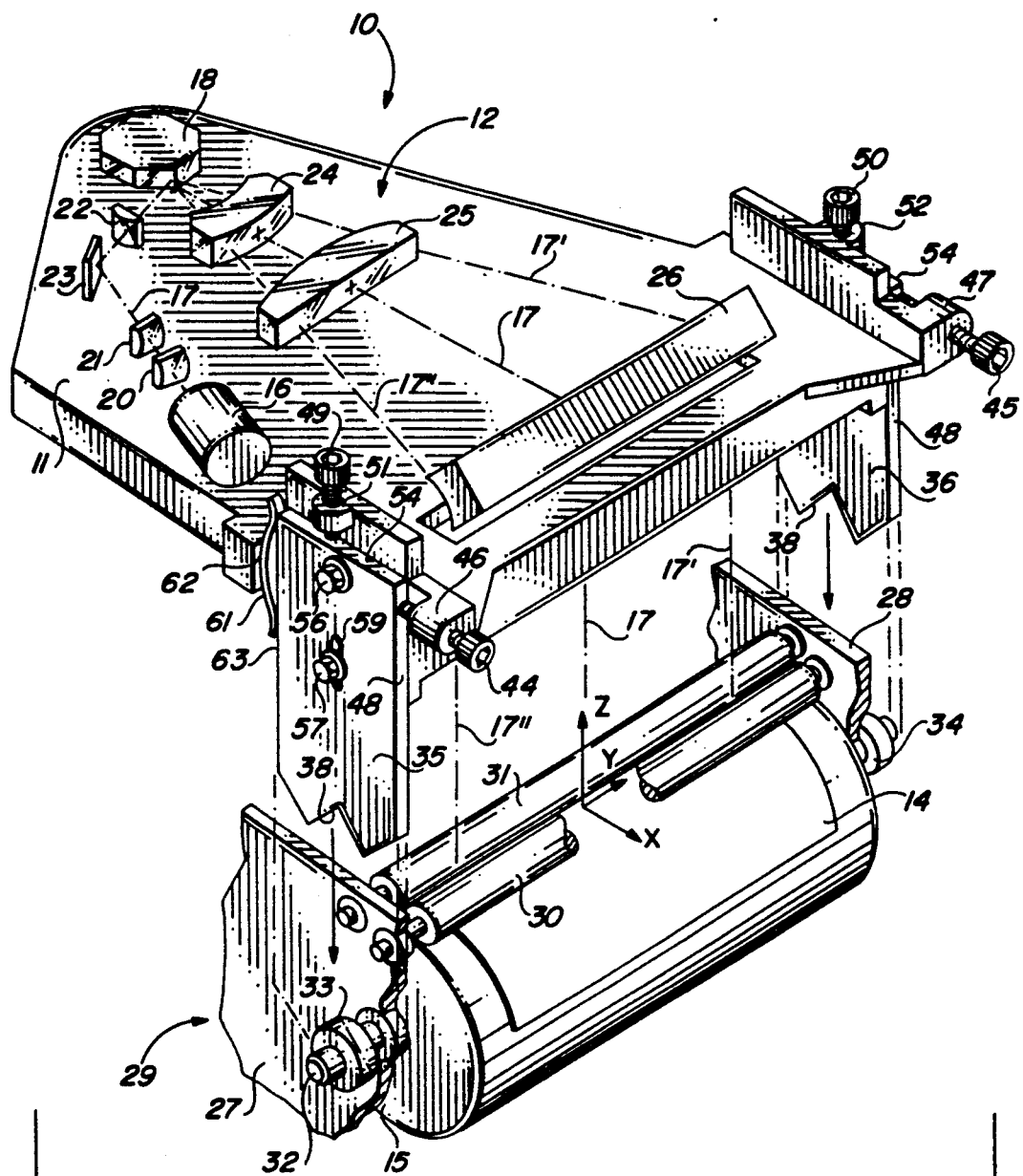
FIG. 1 is an exploded perspective view of a drop-in optics module in accordance with the invention employed with a printer having a rotating drum.
Figure 3:
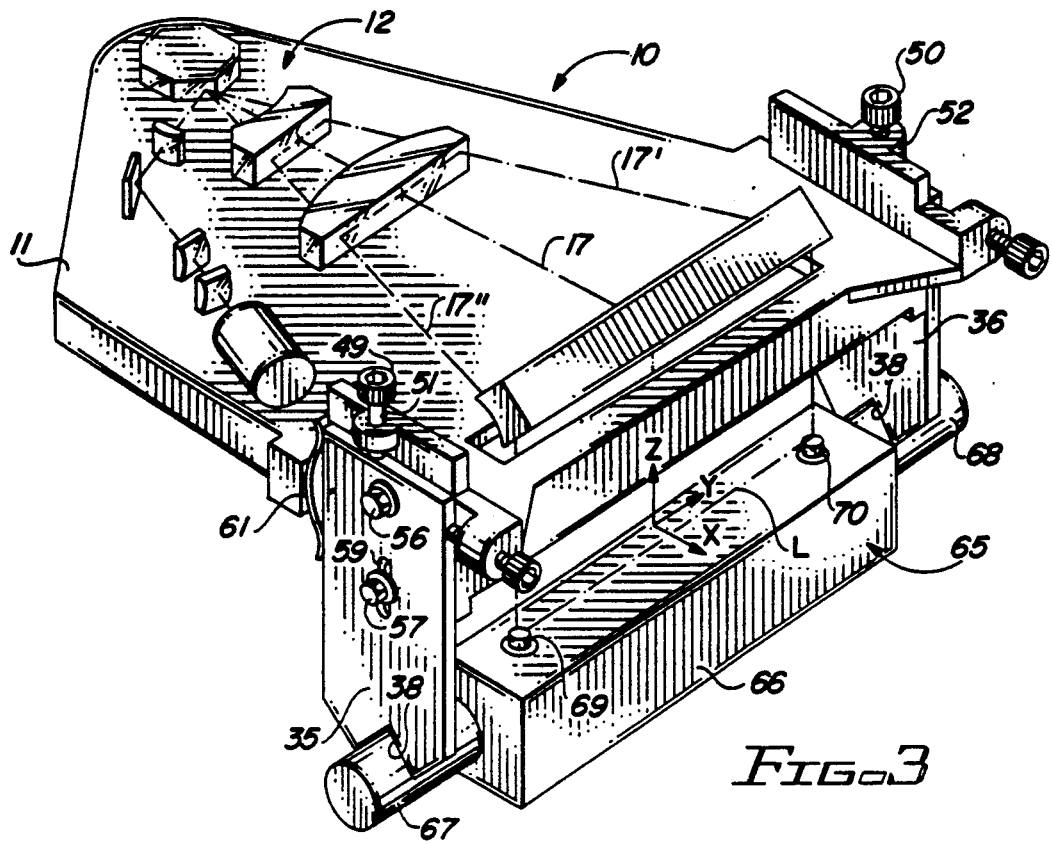
FIG. 3 is a perspective view of the optics module of FIG. 1, shown in place on a fixture usable for making positional adjustments.

As shown in FIGS. 1 and 3, a drop-in optics module 10 comprises a rigid frame 11 on an upper surface of which are fixed, in typical arrangement, the elements of an optical system 12 suitable for generating a laser beam along a z (beam path or focus) direction, and scanning the same along a line L (FIG. 3) in the y (scan or page width) direction onto a film or similar medium 14. The medium 14 is supported for movement in an x (cross-scan or page length) direction on the outside cylindrical surface of a rotatable drum 15 (FIG. 1). The optical system 12 is configured to assure that the generated scan line L will be sufficiently straight for the intended printing purposes, and means are provided in accordance with the invention, as further described below, for adjustably rigidly mechanically connecting the module 10 and the drum 15 to achieve proper placement of the scan line L onto the medium 14.

In accordance with well-known principles, the optical system 12 includes an optical head 16 for projecting the beam of laser light along an optical beam path 17 (dot-dashed lines) coincident with the z direction. The beam 17 is modulated in accordance with information received from an image signal generating circuit (not shown), and scanned line-by-line in the y direction (from 17' to 17") onto the medium 14 by means of a rotating polygon 18. A start-of-scan detector (not shown) controls the timing of the light beam modulation. Optical elements, comprising lenses 20, 21, 22 and folding mirror 23, control the shape, focus and path of the beam between the optical head 16 and mirrored multiple facets of the polygon 18. Optical elements, comprising lenses 24, 25 and mirror 26 located between polygon 18 and drum 15, correct for differences in beam focus in the y direction due to the f-$\theta$ condition and correct for displacements of the image in the x direction due to pyramid facet out-of-plane wobble and angle errors. The invention is directed at eliminating focal errors that may occur due to misplacement of the optics generated scan line L. The addressed errors are those due to deviations from normal (or other desired) angle of incidence of beam 17 with the recording medium 14; and those due to misplacement in the $\theta_x$ and $\theta_z$ rotational and x and z translational directions of the delivered scan line from its intended placement on the recording medium 14.

The drum 15 is mounted on shaft 32, journalled for rotation between opposing walls 27, 28 of the printer body 29 (FIG. 1). Pressure rollers 30, 31 are rotatably supported in spaced alignment between the same walls 27, 28, to ride along the cylindrical surface of drum 15 for the purpose of holding the medium 14 against the drum 15 on either side of the scan line L. Left and right ends of the drum shaft 32 have bearings 33, 34 which provide cylindrical reference surfaces for receiving the adjustable mechanical connection between the frame 11 and the drum 15.

Figure 2:
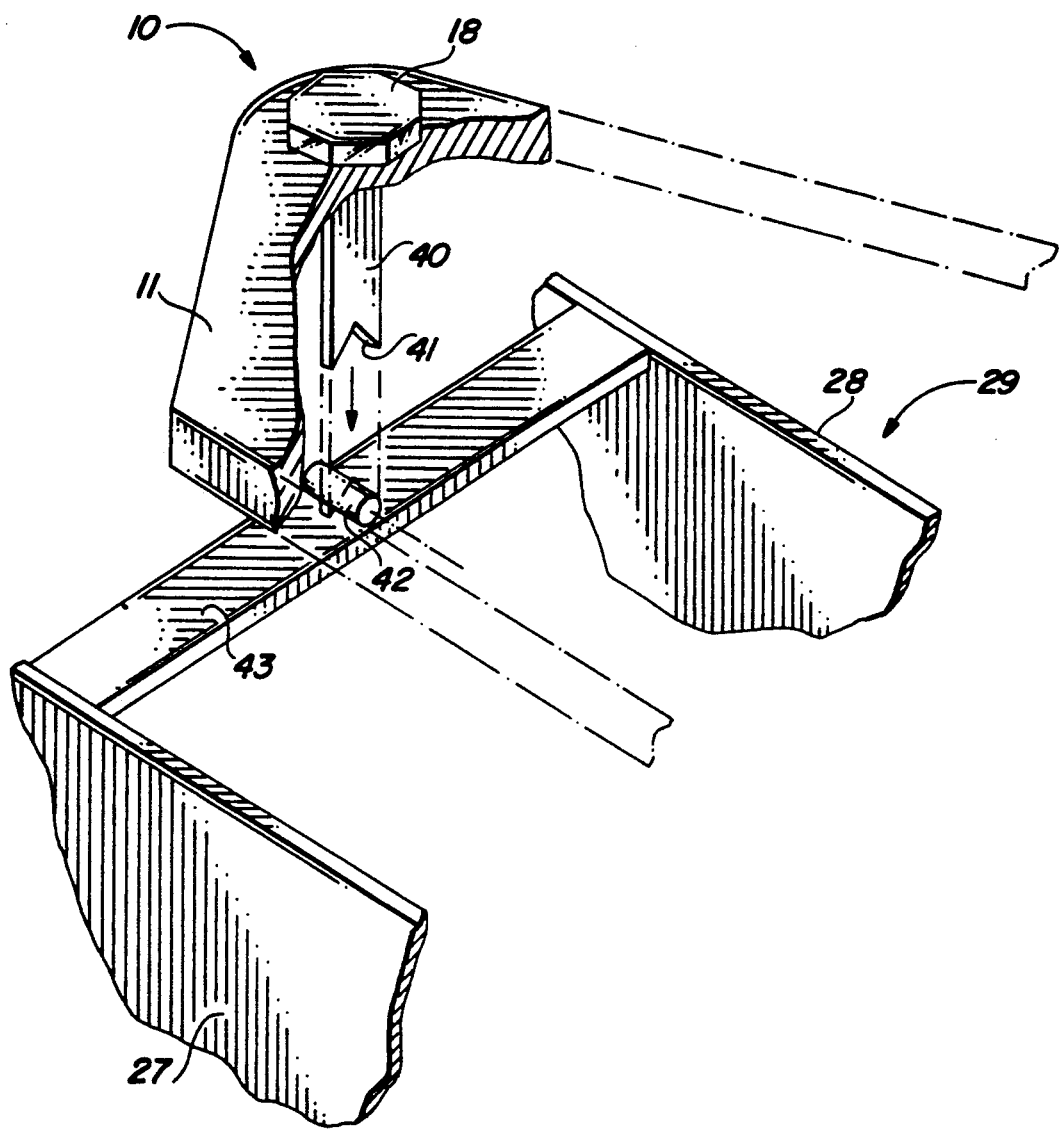
FIG. 2 is a customary fragmentary view of the optics module of FIG. 1, showing rear portion module seating elements.
Figure 4:
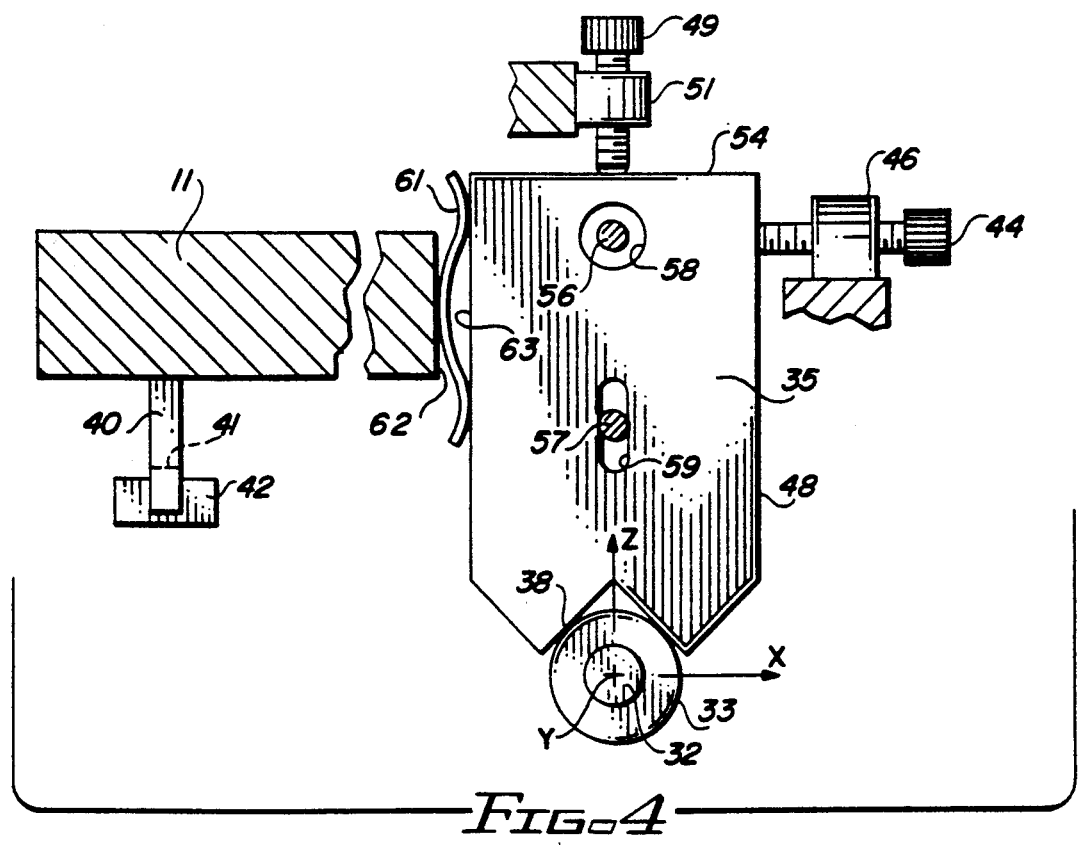
FIG. 4 is a schematic side view of an adjustable block portion of the module of FIG. 1, helpful in understanding the positional adjustment operation.

As shown in FIGS. 1, 2 and 4, the depicted mechanical connection has two x-z planar mounting blocks or plates 35, 36 which depend vertically, respectively from left and right sides of a weighted front portion of the frame 11. Each block 35, 36 includes a lower end having a centrally located, upwardly-directed, inverted V-notch 38 of isosceles triangular shape having an interior angle of 90.. The notches 38 are dimensioned, configured and adapted to be received in two-point tangential abutment over the cylindrical surfaces of the respective bearings 33, 34, as illustrated. The rear of frame 11 includes an x-z planar projection 40 (FIG. 2) depending from the undersurface of frame 11. The projection 40 is located below the polygon 18, rearwardly of the notches 38 and includes an inverted V-notch 41 (FIG. 2 and 4) mountable in two-point tangential abutment over a cylindrical surface provided by a pin 42 supported in x direction axially aligned position on a beam 43 connected between the walls 27, 28, rearwardly of the bearings 33. The downward extensions or z directional positions of blocks 35, 36 relative to frame 11 act to establish the z and $\theta$ directional positions of frame 11 relative to the drum 15 and medium 14. The x directional positions of the blocks 35, 36 relative to the frame 11 act to establish the x and $\theta_z$ directional positions of frame 11 relative to the drum 15 and medium 14. The notch 41 acting on pin 42 serves as a stop to prevent rotation of the frame 11 due to the moment of the weight of the rear of frame 11 acting about the rotational axis of shaft 32. The notch 41 establishes the y and $\theta_y$ directional positions of the frame 11 relative to the drum 15 and medium 14.

In order to make the x, z, $\theta_x$, $\theta_z$ positioning of frame 11 relative to the medium 14 adjustable, means are provided to permit selective independent adjustment of the positions of blocks 35, 36 in the x and z directions relative to frame 11. As shown in FIGS. 1 and 4, x direction adjustment screws 44, 45 are threaded through x direction bores of lobes 46, 47. Lobes 46, 47 are formed at the front of frame 11 in locations that will enable free end tips of the screws 44, 45 to bear against vertically extending front sides 48 of blocks 35, 36. Z direction adjustment screws 49, 50 are threaded through z direction bores of lobes 51, 52 formed above blocks 35, 36 on frame 11. Lobes 51, 52 are located so that they will enable free end tips of screws 49, 50 to bear against horizontally extending top surfaces 54 of blocks 35, 36. To releasably lock blocks 35, 36 in fixed relationship to frame 11 after adjustment, upper and lower y direction clamping screws 56, 57 are respectively passed through holes 58 and slots 59 of blocks 35, 36 into threaded engagement with y direction bores formed in frame 11 (see FIG. 4).

Leaf springs 61 act between shoulders 62 of frame 11 and vertically extending rear sides 63 of blocks 35, 36 to bias the blocks 35, 36 against the advance in the x direction toward the blocks 35, 36 of the screws 44, 45. Bias against the advance of the screws 49, 50 in the z direction toward the blocks 35, 36 is provided by the downward force of the weight of frame 11. Holes 58 are oversized circular holes that permit shifting of blocks 35, 36 in both x and z directions relative to the shanks of the therein received screws 56 (see FIG. 4). Slots 59 are elongated in the z direction to permit the same amount of shifting relative to the shanks of screws 57 in the z direction, but only slight relative shifting in the x direction. The sides 48, 63 are made parallel, and the holes 58, slots 59 and apexes of notches 38 are aligned with each other and with the sides 48, 63. Lobes 46, 47 are located to place the screws 44, 45 generally in line with the respective holes 58. Lobes 51, 52 are located to place the screws 49, 50 generally in line with the respective holes 58 and slots 59.

The mechanical connection established by blocks 35, 36 between the scan optics frame 11 and the drum 15 provides a short and stiff rigid mounting. The weight of the frame 11 will cause the notches 38, 41 to nest against the bearings 33, 34 and pin 42 to constrain the module 10 in all x, y, z, $\theta_x$, $\theta_y$, $\theta_z$ directions. Spring clips (not shown) connected between the frame 11 or blocks 35, 36 and the printer body 29 can be used to augment the nesting force.

The procedure for accurately positioning the scan line L generated by the optics system 12 relative to the scan line receiving medium 14 can be understood with reference to FIGS. 2 and 3. For calibration purposes, an alignment fixture 65 (FIG. 3) is utilized to simulate the drum 15. The fixture 65 comprises a body member 66 positioned between two coaxially-aligned cylindrical ends 67, 68 which have cylindrical surfaces of the same diameter as drum bearings 33, 34. A plurality of light beam sensors, such as an arrangement of two quad cells 69, 70, are located on an upper surface of body member 66 intermediate the ends 67, 68 in radially facing positions, in line with the coaxial axes of ends 67, 68. The quad cells 69, 70 are spaced radially from the axes of ends 67, 68 by a distance equal to the radius of drum 15 plus the thickness of the recording medium 14. For the two quad cell arrangement shown, the quad cells 69, 70 are spaced longitudinally from each other by a distance preferably corresponding to 70°-100° of the width of the scan line L. Additional quad cells may be employed.

The frame 11, with blocks 35, 36 attached, is placed over the fixture 65, with notches 38 of blocks 35, 36 brought into two-point tangential contact with the cylindrical surfaces of the fixture ends 67, 68. The clamping screws 56, 57 are loosened, causing the weight of the frame 11 to urge the tips of the z direction screws 49, 50 down into contact with the top surfaces 54 of blocks 35, 36. The leaf springs 61 push the front sides 48 of blocks 35, 36 into contact with the tips of the x direction screws 44, 45. The same springs 61 also cause the rear sides of slots 59 to be urged against the shanks of the lower clamping screws 57.

To change the z position of frame 11 relative to block 35, screw 49 is moved in the z direction within lobe 51 toward or away from the top surface 54 of block 35. This movement causes a corresponding change in the z position of the end 17″ of scan line L relative to quad cell 69 (which represents the same change relative to one edge of the medium 14). Likewise, to change the z position of frame 11 relative to block 36, screw 50 is moved in the z direction within lobe 52, toward or away from the top surface 54 of block 36. This movement causes a corresponding change in the z position of the end 17′ of scan line L relative to quad cell 70 (which represents the same change relative to the medium 14). The screws 49, 50, thus, set the z direction position of scan line L relative to the medium 14 and to the extent that the z direction adjustment of one block 35, 36 is different from that of the other block 35, 36, also set the $\theta_x$ position of scan line L relative to the medium 14.

Movement of screw 44 within the lobe 46 in the x direction toward or away from the front surface 48 of block 35 changes the x position of the frame 11 relative to block 35 and, thus, changes the x position of the end 17″ of scan line L relative to quad cell 69 (i.e., relative to the medium 14). Likewise, movement of screw 45 within the lobe 47 in the x direction toward or away from the front surface 48 of block 36 changes the x position of frame 11 relative to block 36 and, thus, changes the x position of the end 17′ of scan line L relative to quad cell 70 (i.e., relative to the medium 14). The screws 44, 45, thus, set the x direction position of scan line L relative to the medium 14 and, to the extent that the x direction adjustment of one block 35, 36 is different from that of the other block 35, 36, also set the $\theta_z$ position of scan line L relative to medium 14.

Alignment of the z directional elongation of slot 59 with the center of hole 58 and the apex of notch 38 in each block 35, 36, ensures that the angle of incidence of the beam 17 will remain the same (i.e., radial to the drum 15 and normal to the medium 14) for changes in the x or $\theta_x$ positioning. The angular orientation is maintained because radial alignment of slot 59 and the apex of notch 38 is maintained. The slot 59 is oversized in the x direction, but only by a slight amount, sufficient to permit the shank of screw 57 to be moved up and down in the slot 59. The shank of screw 57, which will be located between the apex of notch 38 and the hole 58, thus causes an angular adjustment of blocks 35, 36 in the $\theta_y$ direction relative to the frame 11 for x directional shifts between the hole 58 and the shank of screw 56. The radial alignment acts so that the angular correction keeps the angle of incidence of beam 17 the same. (It will be appreciated by those skilled in the art that the alignment of the slot 59 and apex of notch 38 may be dimensioned, configured and adapted to maintain a constant angle of incidence which is other than normal.)

Once the independent settings of screws 44, 45, 49, 50 have been made, thereby establishing the x, z, $\theta_x$, $\theta_z$ positional relationships between the scan line L and the medium 14, the clamping screws 56, 57 are tightened to lock the blocks in their selectively adjusted positions relative to frame 11. Because of the simulation of the drum 15 by the fixture 65, these positional relationships will be maintained when the drop-in optics module is subsequently mounted on the bearings 33, 34 of the printer. The bearings 33, 34 are arranged relative to the shaft 32 to have a spacing corresponding to the spacing of the blocks 35, 36 relative to the frame 11. The pin 42 is located on the printer so that notch 41 will nest on pin 42 when the blocks 35, 36 are nested onto bearings 33, 34. The pin 42 establishes the y direction positioning of frame 11 relative to the drum 15 and, as mentioned above, acts as a stop to prevent rotation of the frame 11 about the drum shaft 32. The y positioning of scan line L relative to the medium 14 can be controlled by means of the end-of-scan sensor, so is not that critical.

Those skilled in the art to which the invention relates will appreciate that other substitutions and modifications can be made to the described embodiment without departing from the spirit and scope of the invention as described by the claims below.

We claim:

1. A printer, having a body member; means, mounted on the body member, for supporting a recording medium for movement in an x (cross-scan) direction; a frame; means, mounted on the frame, for generating a beam along a z (beam path) direction and scanning the beam in a y (scan) direction along a scan line; and means, mechanically connecting the frame to the body member, for positioning the scan line onto the recording medium; characterized in that:

the means for supporting the recording medium has two curved surfaces spaced in the y direction; and
   the means for positioning the scan line comprises two blocks mounted on the frame and having upwardly-directed, inverted V-notches, respectively received in two-point tangential abutment over the curved surfaces; means for enabling selective independent adjustments of the positions of the blocks in x and z directions relative to the frame; and means for releasably locking the blocks in their selectively adjusted positions relative to the frame.

2. A printer, as in claim 1, wherein the means for positioning the scan line further comprises means, cooperative with the means for enabling selective independent adjustments, for maintaining a constant angle of incidence of the scan line onto the recording medium for adjustments in position of the blocks in the x and z directions relative to the frame.

3. A printer, as in claim 1, wherein the means for positioning the scan line further comprises stop means to prevent rotation of the frame in a $\theta_y$ rotational direction about the y direction.

4. A printer, as in claim 3, wherein the means for positioning the scan line further comprises means to establish the positions of the blocks in the y direction relative to the frame.

5. A printer, as in claim 4, wherein the body member includes another curved surface, axially aligned in the x direction; and the means to establish the positions of the blocks in the y direction comprises a projection mounted on the frame and having an upwardly-directed, inverted V-notch received in two-point tangential abutment over the another curved surface.

6. A printer, as in claim 1, wherein the means for permitting independent adjustments in the x direction comprises two x direction adjustment screws, means mounting the x direction adjustment screws on the frame for selective respective independent movement in the x direction against the blocks; and means, operating between the frame and the blocks, for biasing the blocks against the x direction adjustment screws.

7. A printer, as in claim 6, wherein the means for biasing comprises leaf springs.

8. A printer, as in claim 6, wherein the means for permitting independent adjustments in the z direction comprises two z direction adjustment screws; means mounting the z direction adjustment screws on the frame for selective respective independent movement in the z direction against the blocks; and means, operating between the frame and the blocks, for biasing the blocks against the z direction adjustment screws.

9. A printer, as in claim 1, wherein the blocks are formed with holes; and the means for releasably locking the blocks comprises first clamping screws have first shanks respectively passing through the holes into engagement with the frame; the holes being oversized relative to the first shanks.

10. A printer, as in claim 9, wherein the blocks are further formed with slots elongated in the z direction and located below the holes; and the means for releasably locking the blocks further comprises second clamping screws having second shanks respectively passing through the slots into engagement with the frame; the holes, slots and V-notches of the respective blocks being in z direction alignment with each other.

11. A printer, having a body member; a drum, including a drum surface for supporting a recording medium and having opposite ends, movably supported on the body member for rotation about a y (scan) direction to move the supported recording medium in an x (cross-scan) direction; a frame having front and rear portions; an optical system, mounted on the frame, for generating a beam along a z (beam path) direction and scanning the beam in the y direction along a scan line; and means, mechanically connecting the frame to the body member, for positioning the scan line onto the recording medium; characterized in that:

the printer further comprises bearings, respectively located proximate the drum opposite ends and having cylindrical surfaces; and the means for positioning the scan line comprises two x-z planar blocks mounted on the frame front portion and having upwardly-directed, isosceles triangular, inverted V-notches respectively received in two-part tangential abutment over the cylindrical surfaces; means, attached to the frame and extending into contact with the blocks, for enabling selective independent adjustments of the positions of the blocks in the x and z directions relative to the frame; and means, attached to the frame, for releasably locking the blocks in their selectively adjusted positions relative to the frame.

12. A printer, as in claim 11, wherein the blocks have front, rear and top surfaces; and the means for enabling selective independent adjustments in the x direction comprises two x direction adjustment screws; means mounting the x direction adjustment screws on the frame for selective independent movement in the x direction respectively against ones of the front and rear surfaces of the blocks; and spring means, operating between the frame and others of the front and rear surfaces, for biasing the ones of the front and rear surfaces against the x direction adjustment screws.

13. A printer, as in claim 12, wherein the means for enabling selective independent adjustments in the z direction comprises two z direction adjustment screws; means mounting the z direction adjustment screws on the frame for selective independent movement in the z direction respectively against the top surfaces of the blocks.

14. A printer, as in claim 13, wherein the blocks are formed with holes and slots, the slots being elongated in the z direction and respectively located in z direction alignment intermediate the holes and the V-notches; and the means for releasably locking the blocks comprises first clamping screws with first shanks respectively passing through the holes into engagement with the frame, the holes being oversized relative to the first shanks, and second clamping screws having second shanks respectively passing through the slots into engagement with the frame.

15. A printer, as in claim 14, wherein the body member includes another cylindrical surface, axially aligned in the x direction; and the means for positioning the scan line further comprises a projection mounted on the rear of the frame and having an upwardly-directed, inverted V-notch received in two-point tangential abutment over the another cylindrical surface.

16. A printer, having a body member; a shaft having opposite ends journalled on the body member for rotation about a y (scan) direction; a drum mounted on the shaft and including a cylindrical surface for supporting a recording medium for movement in the x (cross-scan) direction with rotation of the shaft; a rigid frame having front and rear portions; an optical system, mounted on the frame, for generating a beam along a z (beam path) direction and scanning the beam in the y direction along a scan line; and apparatus for rigidly mechanically connecting the frame to the body member, to position the scan line on the recording medium, characterized in that the apparatus comprises:

bearings, respectively located proximate the shaft opposite ends and having cylindrical surfaces;

x-z planar blocks mounted on the frame front portion and having upwardly-directed, isosceles triangular, inverted V-notches respectively received in tangential abutment over the cylindrical surfaces;

means, attached to the frame and extending into contact with the blocks, for enabling selective independent adjustment of the positions of the blocks in the x direction relative to the frame;

means, attached to the frame and extending into contact with the blocks, for enabling selective independent adjustment of the positions of the blocks in the z direction relative to the frame;

means, cooperative with the means for enabling adjustment in the x direction, for maintaining a constant angle of incidence of the scan line onto the recording medium for adjustments in the position of the blocks in the x directions relative to the frame; and means, attached to the frame, for releasably locking the blocks in their selectively adjusted positions relative to the frame.

17. A printer, as in claim 16, wherein the means for positioning the scan line further comprises stop means to prevent rotation of the frame in a $\theta_y$ rotational direction about the y direction.

18. A printer, as in claim 17, wherein the means for positioning the scan line further comprises means to establish the positions of the blocks in the y direction relative to the frame.

19. A printer, as in claim 18, wherein the body member includes anther cylindrical surface, axially aligned in the x direction; the means to establish the positions of the blocks in the y direction comprises a y-z projection mounted on the frame and having an upwardly-directed, inverted V-notch received in two-point tangential abutment over the another cylindrical surface.

20. A printer, as in claim 17, wherein the blocks are further formed with holes and slots elongated in the z direction and located below the holes; and the means for releasably locking the blocks and means for maintaining the constant angle of incidence further comprise first clamping screws having first shanks respectively passing through the holes into engagement with the frame, and second clamping screws having second shanks respectively passing through the slots into engagement with the frame; the holes being oversized relative to the first shanks, and the holes, slots and V-notches of the respective blocks being in z direction alignment with each other.

* * * * *